(12) United States Patent
Kreuzer et al.

(10) Patent No.: US 7,302,749 B2
(45) Date of Patent: Dec. 4, 2007

(54) METHOD OF MAKING A TWO-LAYER LAP WINDING FOR A MULTIPHASE ELECTRICAL MACHINE

(75) Inventors: Helmut Kreuzer, Schwieberdingen (DE); Eberhard Rau, Korntal-Muenchingen (DE); Reinhard Bezner, Gemmrigheim (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 10/842,128

(22) Filed: May 10, 2004

(65) Prior Publication Data

US 2004/0216302 A1 Nov. 4, 2004

(30) Foreign Application Priority Data

Jun. 30, 2003 (DE) ............................ 103 29 576

(51) Int. Cl.
*H02K 15/00* (2006.01)

(52) U.S. Cl. ............................ 29/596; 29/598; 29/605; 29/606; 29/857; 310/43; 310/266; 310/268; 360/42; 360/43; 360/255

(58) Field of Classification Search ............... 29/596, 29/598, 605, 606, 857; 310/43, 266, 268; 360/42, 43, 266
See application file for complete search history.

(56) References Cited

U.S. PATENT DOCUMENTS 5,197,180 A 3/1993 Mihalko 5,319,844 A * 6/1994 Huang et al. .............. 29/598
5,425,165 A * 6/1995 Shramo et al. ............ 29/596
2003/0071534 A1 4/2003 Kreuzer et al.

FOREIGN PATENT DOCUMENTS

| DE | 1 563 094 | 5/1970 |
| DE | 1 613 391 | 10/1970 |
| WO | 91/09449 | 6/1991 |

* cited by examiner

*Primary Examiner*—Tim Phan
(74) *Attorney, Agent, or Firm*—Michael J. Striker

(57) ABSTRACT

The method of making a two-layer lap winding (12) for a multiphase electrical machine includes the steps of winding a first coil unit (20) of a first phase winding (14) around a winding bar (10); subsequently laying a coil connector (18) of the first phase winding (14) in a first direction and then winding at least one other coil unit (16) of at least one other phase winding (14) around the winding bar (10) and over the coil connector (18). Subsequently a second coil unit (22) of the first phase winding (14) is wound around the winding bar (10) following all first coil units of all phase windings and after all coil connectors from the first coil units are laid. A method of making a stator from the two-layer lap winding (12) is also described.

7 Claims, 9 Drawing Sheets

US 7,302,749 B2

METHOD OF MAKING A TWO-LAYER LAP WINDING FOR A MULTIPHASE ELECTRICAL MACHINE

CROSS REFERENCE TO RELATED DOCUMENT

This application claims priority of invention based on German Patent Application No. 103 29 576.3, filed on Jun. 30, 2003, under 35 U.S.C. 119.

BACKGROUND OF THE INVENTION

U.S. Pat. No. 5,197,180 discloses a method of making a two-layer lap winding using a so-called winding bar or beam. The sequence of the individual winding steps for making this three-phase winding is such that all coil connectors of the coil units are arranged outside the winding ends. This arrangement of the coil connectors outside the winding ends is especially disadvantageous, when, as is usually the case for a generator, cooling air flowing around the winding ends cools them. These sorts of exterior coil connectors produce an unsymmetrical arrangement on the surface of the winding ends, so that noise producing flow interruptions or eddies result and consequently the side of the winding on which the coil connections are arranged is critical. Furthermore it is disadvantages that these types of coil connectors cover a part of the wires of the winding ends and consequently can only reduce the cooling air that reaches these places. As a result the cooling action at these locations is impaired so that the temperature increases, the current load capacity of the lap winding drops and the entire efficiency of the machine is reduced below what it could be.

SUMMARY OF THE INVENTION

It is an object of the claimed invention to provide an improved method of making a two-layer lap winding, especially for a multiphase electrical machine, particularly an electric motor, alternator or generator, which does not suffer from the above-described disadvantages.

According to the invention the method of making a two-layer lap winding for a multiphase electrical machine from a wire bundle comprises the steps of:

a) winding a first coil unit of a first phase winding around a winding bar;

b) subsequently laying a coil connector of the first phase winding in a first direction; and c) winding at least one other coil unit of at least one other phase winding over the coil connector.

The method according to the invention for making a two-layer lap winding with the features described above has the advantage that at least one part of the coil connectors are arranged within the winding ends formed by the individual coil units of the respective phases. Thus the corresponding two-layer lap winding and especially the winding ends with the coil connectors are cooled better. The current load capacity of the lap winding is thus improved, the current production of the electrical machine equipped with these coil connectors is improved in regard to the current load capacity and efficiency.

Advantageous improvements of the features of the above-described method according to the invention are possible by incorporating the features claimed in the appended dependent claims and described below. A further improvement of the winding ends and thus an improvement of the current carrying behavior results when at least one coil unit embraces or goes around two coil connectors between two coil units of a phase winding, which immediately follow each other in succession on the winding bar.

An especially economical production of a two-layer lap winding results when at least one phase winding is completely wound and subsequently at least one other phase winding is completely wound. With this sort of method the phase windings are wound without interruption so that the winding process is completed especially easily and efficiently. When the coil unit wound in a further step is a first coil unit of a further phase and another coil connector is laid in the first direction, the basis is provided for a winding end that appears especially uniform from the outside. Coil connectors are arranged within the winding ends by the provided sequence of winding steps.

When the at least one further first coil unit of at least one further phase is wound over two already laid coil connectors, it is possible to obtain a three-phase lap winding, whose coil connectors are assembled entirely within the winding ends. From the outside the winding ends of the three-phase lap winding appear uniform without discontinuities, which can lead to more noise and impaired cooling.

An especially economical method results when all of the coil connectors connected to the first coil units extend to the starting positions of the respective second coil units of the corresponding phase windings after the winding of the first coil units.

An additional improvement of the winding ends results when the second coil units of the phase windings are wound in the same sequence as the first coil units of these phase windings. They are followed by coil connectors, which extend to the starting position of the respective further first coil units of these phase windings. This process step is a condition for uniform winding ends.

In order to make a two-layer lap winding, which can be inserted in a strip-like stator member provided with grooves and teeth on one side, each phase winding has first and second coil units arranged alternating with each other in the winding direction. For this purpose each coil unit has at least one first and second coil side, which are opposite to each other. After winding the phase windings on the winding bar the lap winding is removed from it and the first and second coil units are turned or swung, so that at least one second coil side of each phase is laid on at least one first coil side of the coil unit of the same phase that is immediately following it in the winding direction.

To make this two-layer lap winding it is desirable that during bending the wire is not too troublesome. For that reason the wire bundle used comprises at least two individual wires, which are preferably simultaneously wound.

Finally a method for making a stator of an electric machine is provided, in which a strip-like stator member is already prepared with grooves and teeth on one side in a first step. In a subsequent step a two-layer lap winding made by the methods according to the invention described above is inserted in the grooves of the stator member to form a stator component assembly. Then finally the stator component assembly can be bent to form a hollow cylindrical stator.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
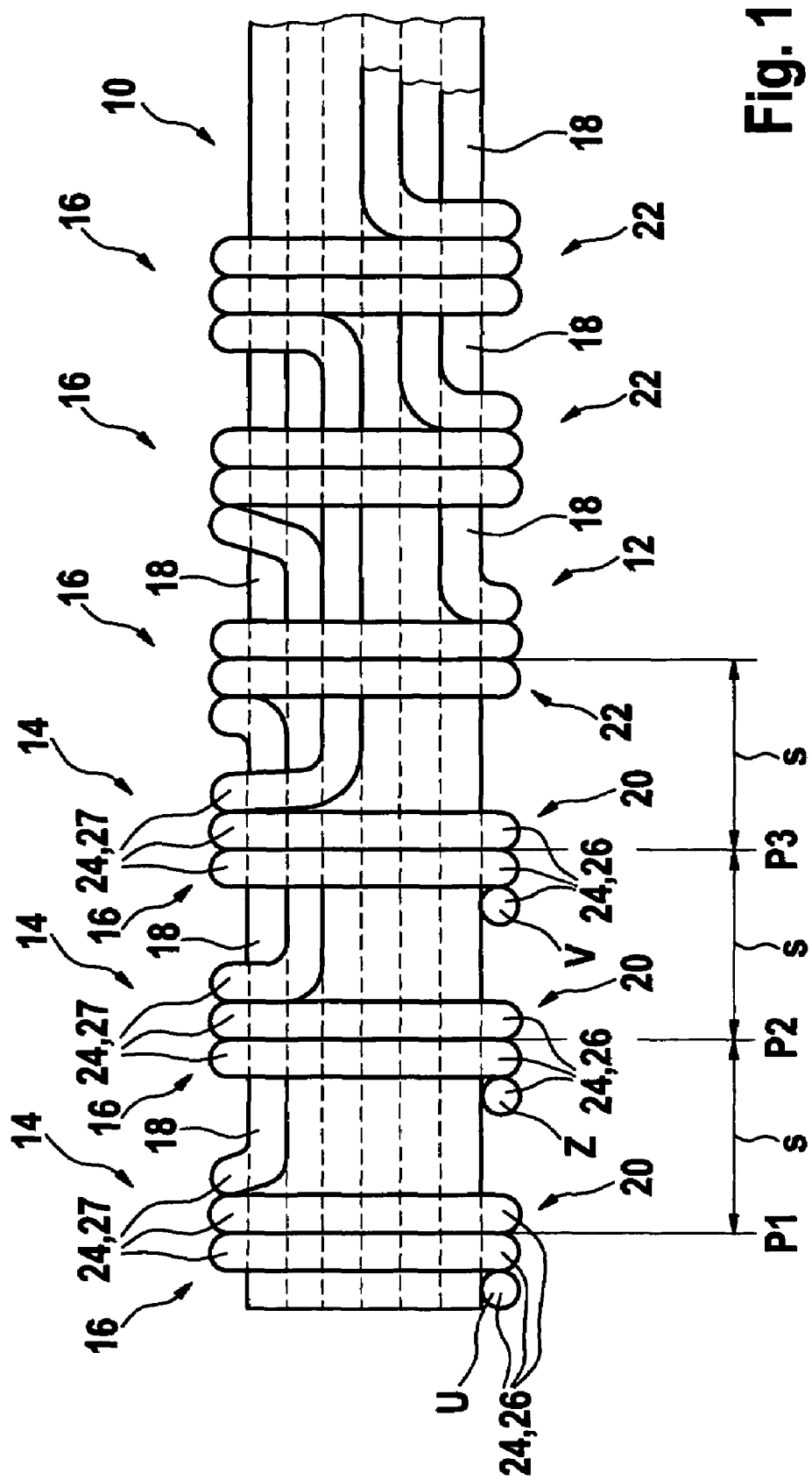
FIG. 1 is a schematic side view of a first embodiment of a two-layer lap winding on a winding beam, on which the first two coil units of each of the three phase windings and their coil connectors are shown.

A so-called winding bar 10, which acts as an aid, for making a multiphase two-layer lap winding for an electrical machine, is shown in detail in FIG. 1. The lap winding 12 comprises three-phase windings 14 in the embodiment shown in FIG. 1. These three-phase windings 14 each have a winding beginning U, Z or V. The individual phase windings 14 comprise coil units 16 and coil connectors 18. Each phase winding 14 has a so-called first coil unit 20 and second coil unit 22. The first coil units 20 and the second coil units 22 are wired alternately with each other and connected with each other by coil connectors 18. As a result a first coil unit 20 in one phase winding is connected with a coil connector 18 to a second coil unit 22, which again is connected by another coil connector 18 with another first coil unit 20.

FIG. 1 shows the lap winding 12, which is made as follows:

First a first coil unit 20 with a predetermined number of loops is wound around the winding bar 10 at a first position P1. In the example shown in the drawing the first coil unit 20 at the position P1 is looped around the winding bar 10 so that that six coil sides 24 are laid on the winding bar 10. A following coil connector 18 is connected to this first coil unit 20 of the first phase winding 14, which is similarly part of the first phase winding 14 and which is laid in a first direction. This first direction corresponds also to the direction, in which the first coil unit 20 is wound. In FIG. 1 this direction is to the right. This first direction later corresponds to the circumferential direction around a stator of an electrical machine. In a further or later step a coil unit 16 of another phase winding 14 is wound over the flat wound coil connector 18 at a position P2. This coil unit 16 is again a first coil unit 20. In this case the winding beginning U is spaced a distance S from the winding beginning Z of the first coil unit 20 of the second phase winding 14. In this case six coil sides are wound around the winding bar 10 and also looped or slung around the already laid coil connector 18 of the first phase winding 14. Another coil connector 18 is connected to the first coil unit 20 of the second phase winding 14, similar to that already connected in the first phase winding. This other coil connector 18 extends from the first coil unit 20 of the second phase winding 14 and is similarly laid in the already mentioned first direction.

To make a three phase two-layer lap winding in this case it is necessary to wind the already mentioned third phase winding 14 with the winding beginning V. The winding beginning Z is spaced a distance S from the winding beginning V of the third phase winding 14. From this position P3 as many coil sides 14 are laid on the winding bar 10 so that a total of six coil sides 24 are laid on the winding bar 10. The arising first coil unit 20 of the third phase winding 14 is slung or laid around the already laid coil connectors 18 of the first and second phase windings 14, which extend from the first coil units 20 of those phase windings. Similarly a further coil connector 18 is laid from the first coil unit 20 of the third phase winding, which extends again in the first direction.

The positions P1, P2 and P3 are preferably—like the coil beginnings U, Z and V—spaced about a distance S from each other.

In the lap winding 12 shown in FIG. 1 it is provided that first a first phase winding 14 is completely wound, subsequently the second phase winding is completely wound and then finally—in a three phase winding—the third phase winding 14 is completely wound.

So that the lap winding 12 according to FIG. 1 and the associated description can be laid in a strip-like stator member, an additional step is required to remove the winding bar 10 from the interior of the lap winding 12. After the removal of the winding bar 10 the first coil unit 20 and the second coil unit 22 of each phase winding 14 are turned or swung. Because of the manner in which they are turned or swung at least one second coil side 27 of a coil unit 16 is laid on the at least one first coil side 26 of the next coil unit 16 of a phase winding in the winding direction.

That means that the second coil sides 27 of a coil unit 16 shown in FIG. 1 are swung about the position of the first coil side 26 of the same coil unit 16 so that the second coil side 27 of the coil unit 16 of a phase winding 14 is laid on the first coil side 26 of the next coil unit 16 of the same phase winding 14 in the winding direction. The same goes for the coil sides of the other phase windings 14.

Figure 2:
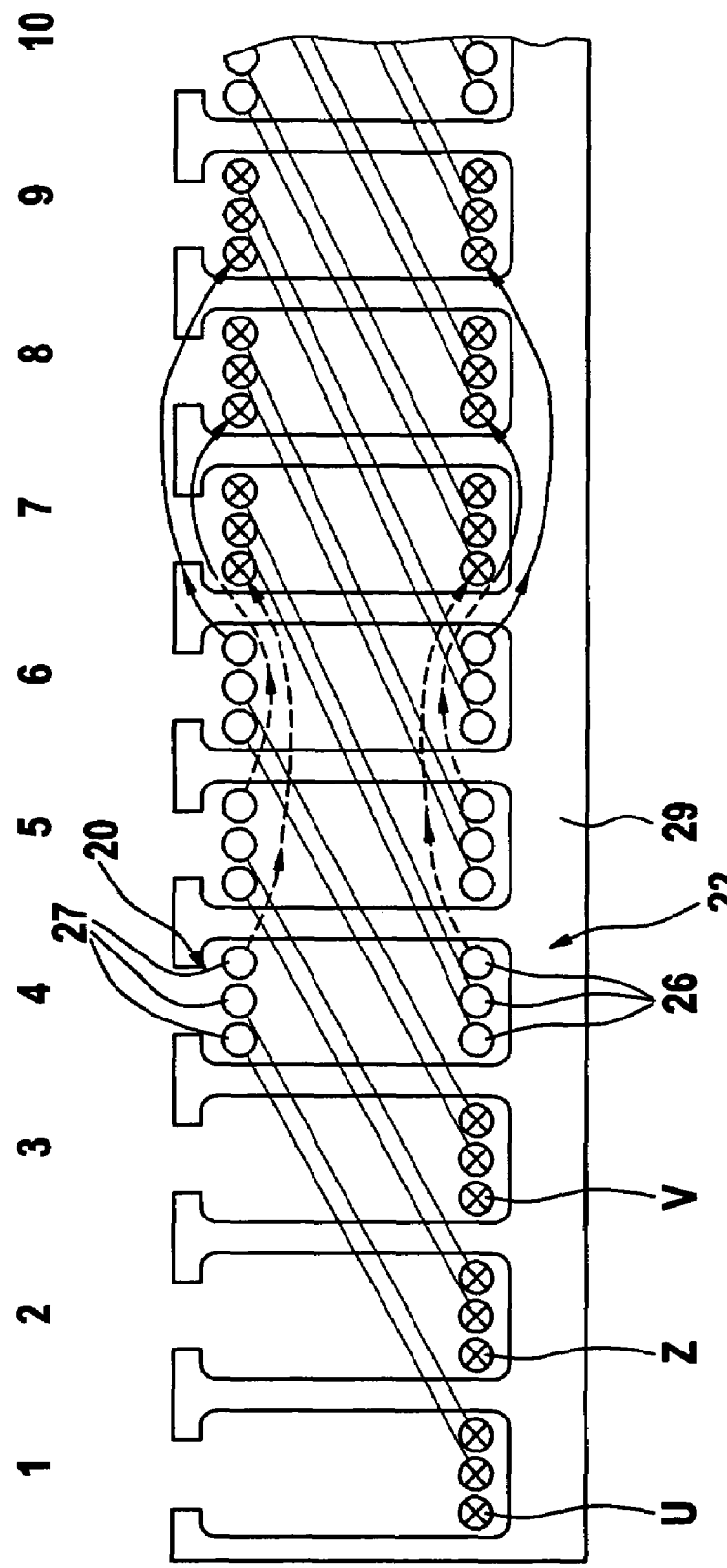
FIG. 2 is a schematic cross-sectional view of the first embodiment of the two-layer lap winding according to FIG. 1 with a diagrammatic representation of the coil connections (wiring) and with the windings laid in a strip-like stator packet.

Thus the characteristic arrangement of the coil units 16 of the phase winding 14 shown in FIG. 2 arises. After swinging the second coil sides 27 in a three phase lap winding 12 the second coil sides 27 of the first coil unit 20 of the first phase winding 14 lie over the first coil sides 26 of the second coil unit 22 of the first phase winding 14. The same goes analogously from the coil sides 24 of the first coil unit 20 of the second phase winding 14 and for the first coil unit 20 of the third phase winding 14.

Figure 3:
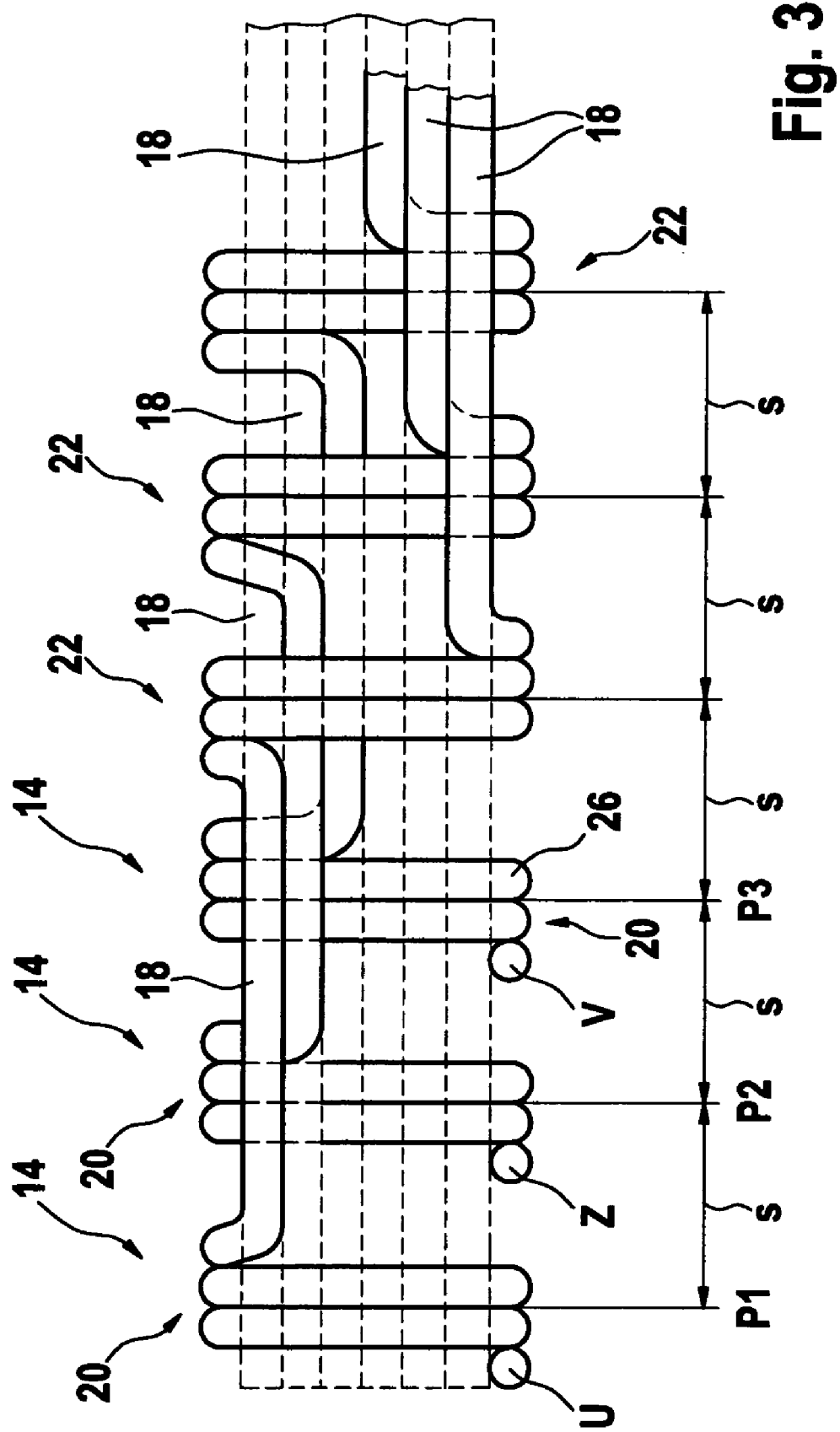
FIG. 3 is a schematic side view of a second embodiment of a two-layer lap winding.

In FIG. 3 another embodiment of the lap winding 12 according to the invention is shown, which is very similar to the lap winding 12 shown in FIG. 1. In the winding 12 shown in FIG. 3 first a first phase winding 14 is started, which is the phase winding 14 with the winding beginning V, not the phase winding 14 with the winding beginning U.

The first coil sides 26 of the first coil unit 20 are first laid in the groove 1 of a strip-like stator packet 29 in the case of the lap winding 12 according to FIG. 1 (see also FIG. 2). In contrast in the case of the lap winding 12 shown in FIG. 3 the first coil sides 26 of the first coil unit 20 of the first phase winding 14 are laid in the groove 3 of a strip-like stator packet. This phase winding 14 starts with the winding beginning V. The phase windings 14 are indeed wound as before in the first direction, which corresponds also to the right in FIG. 3. As stated previously the second phase winding is started with the corresponding winding beginning Z after winding the first phase winding 14. Accordingly the third phase winding 14 is started with the winding beginning U at a position, which is removed two steps S from the first coil unit 20 of the first wound phase winding 14. Accordingly in the second embodiment according to FIG. 3 in a first step a first coil unit 20 is wound at the position P3 of a first phase winding 14 and subsequently a coil connector 18 of the first phase winding 14 is laid in the first direction. After laying this coil connector 18 a second coil unit 22 is wound spaced a distance of three steps S from the first coil unit 20 of the first phase winding 14. A further coil connector 18 extends from the second coil unit 22, which is laid in the first direction. This alternating sequence of first and second coil units 20 and 22 is repeated as long as required. For example with a strip-like stator packet provided for a three phase winding with 36 grooves each phase winding 14 requires six first coil units 20 and six second coil units 22. After the first phase winding 14 is wound the second phase winding 14 with the winding beginning Z is wound over the first phase winding 14. Also it is started at a position P2 spaced with a step S from P3 in an opposite direction from the first direction. Here also a first coil unit 20 is wound, which has a following coil connector 18 connected with a second coil unit 22. The coil connectors 18 generally lie over the first coil units 20 and/or under the second coil units 22. The coil connectors 18 are correspondingly not gripped or embraced by the coil units of the first phase winding 14. In an analogous manner the third phase winding 14 is wound with the winding beginning U. The winding beginning U is spaced about two steps S from the winding beginning V of the first phase winding 14. The first coil unit 20 is wound at this position P1. Another coil connector 18 follows it and is laid in the first direction. This coil connector 18 overlaps the first coil units 20 of the first and second phase winding 14. The second coil unit 22 of the third phase winding overlaps or covers necessarily the coil connectors 18 of the first and second phase windings 14 between the first coil unit 20 and/or the second coil unit 22. As already mentioned in connection with the first embodiment according to FIG. 1 the winding directions of the first coil units 20 are opposite to the winding directions of the second coil units 22.

Figure 4:
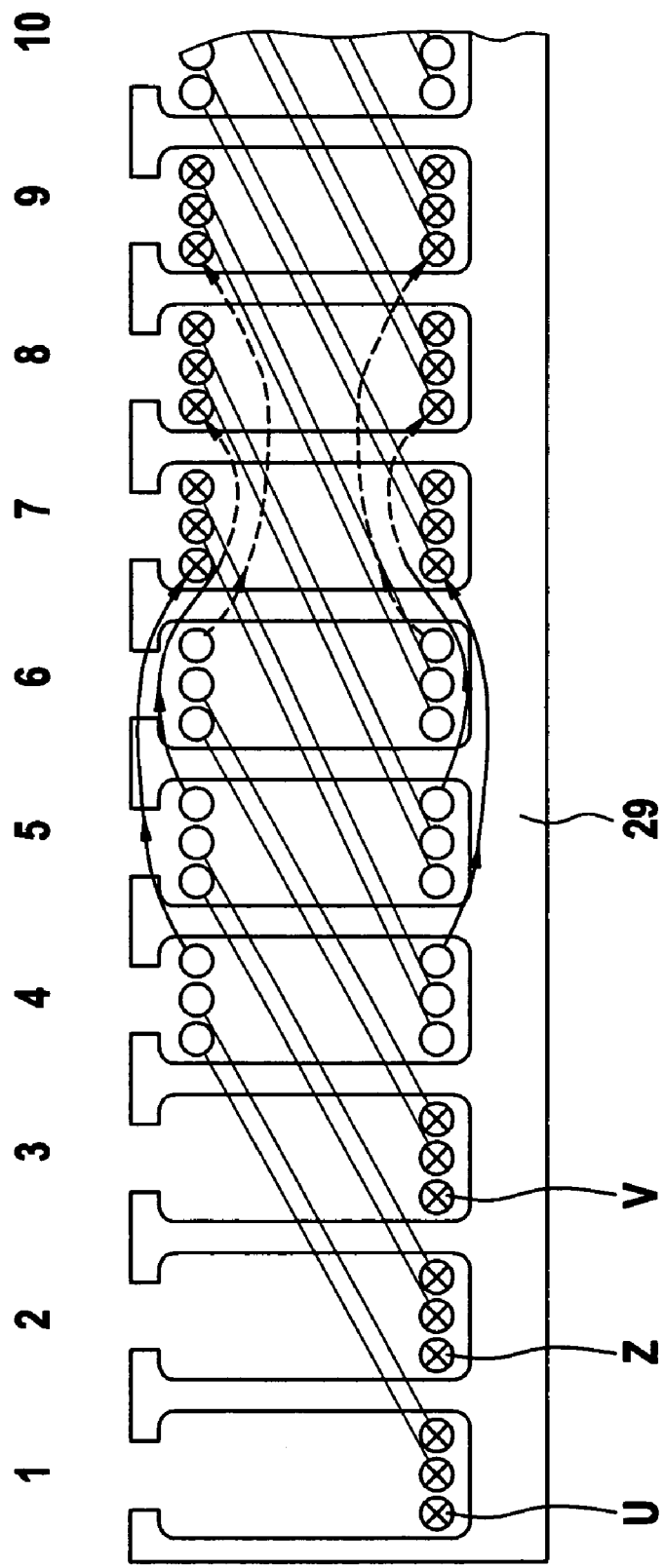
FIG. 4 is a schematic cross-sectional view of the second embodiment of the two-layer lap winding according to FIG. 3 with a diagrammatic representation of the coil connections (wiring) in a strip-like stator member.

FIG. 4 shows how the lap winding 12 made according to the method of FIG. 3 is laid in the already mentioned strip-like stator member 29. The twisting or turning of the second coil sides 27 occurs exactly as in the lap winding 12 according to the embodiment shown in FIG. 1, so that no further explanations are needed. In contrast to the embodiment according to FIGS. 1 and 2 the coil connectors 18—this results already from FIG. 3—are at other positions outside of the first and second coil units 20 and 22.

Figure 5:
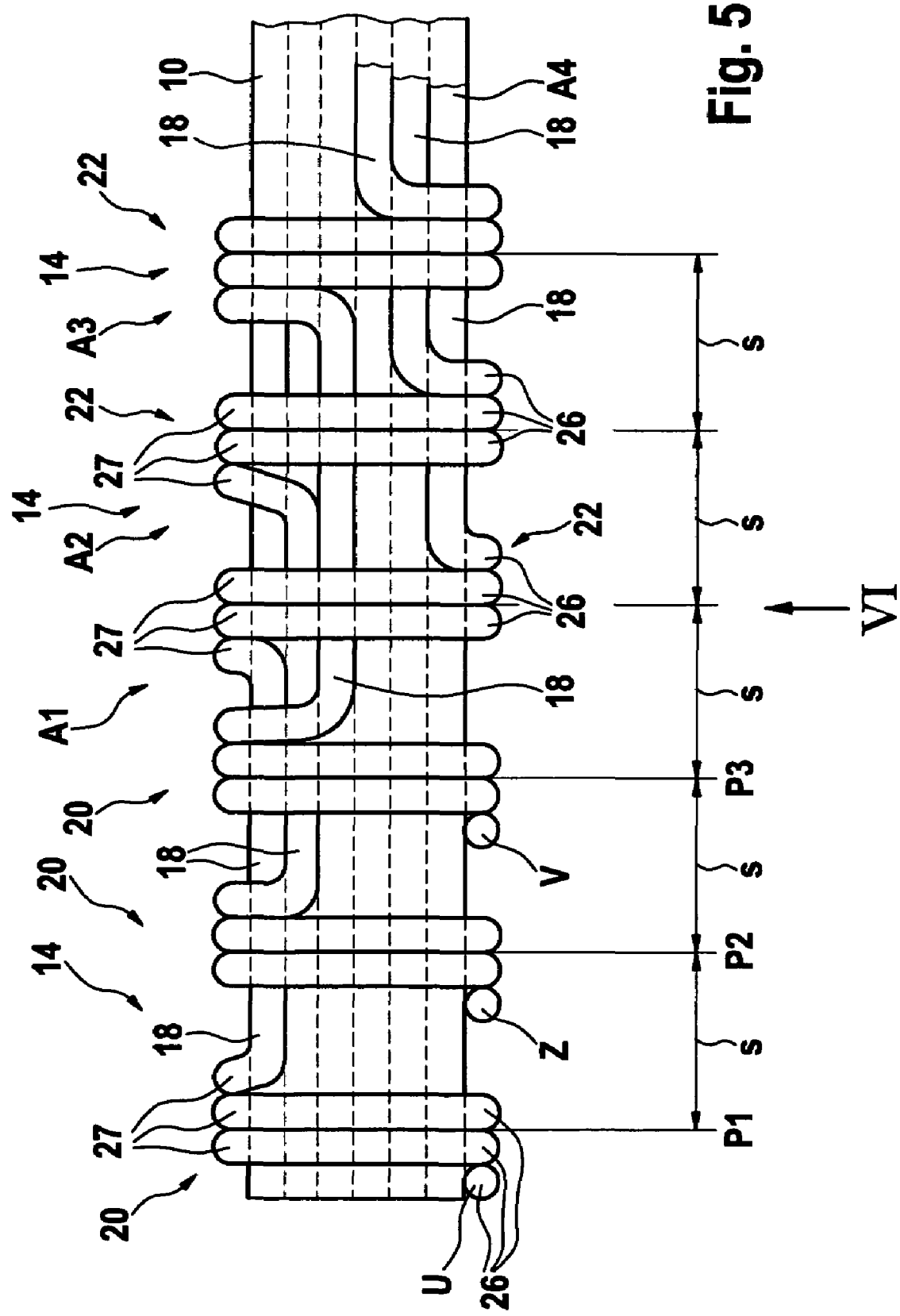
FIG. 5 is a schematic side view of a third embodiment of a two-layer lap winding.

In FIG. 5 a third schematic embodiment of a lap winding 12 is shown. Starting from the position P1 a first phase winding 14 is wound starting with the winding beginning U. Moreover a first coil unit 20 is slung around the winding bar 10 at position P1 in a first step. In this embodiment there are three first coil sides 26 and three second coil sides 27 for each first coil unit 20. A first coil connector 18 extends from the latter second coil sides 27 of the first coil unit 20. This connector is laid in a first direction—to the right in FIG. 5. This happens immediately in the winding of the first coil unit 20. The coil connector 18 is laid to reach the starting position A1 of the second coil unit 22 of the first phase winding 14. In the next step the first coil unit 20 of the second phase winding 14 is wound. In this next step the winding beginning U of the first phase winding 14 is spaced with the step S from the winding beginning Z of the second phase winding 14. Starting from the winding beginning Z also three first winding sides 26 and three second winding sides 27 are laid around the winding beam 10. Immediately after that the first coil connector 18 is laid between the first coil unit 20 and the second coil unit 22 of the second phase winding 14. The coil connector 18 of the first phase winding 14 is thus embrace or overlapped by the first coil unit 20 of the second phase winding 14. Starting from the last wound second coil sides 27 of the first coil unit 20 of the second phase winding 14 a coil connector 18 extends, which is laid in the first direction. This coil connector 18 reaches to the starting position A2 of the second coil unit 22 of the second phase winding 14. In an additional step similarly the winding of the third phase winding 14 is started, in which the coil connector 18 between the first coil unit 20 and the second coil unit 22 ends at a starting position A3 of the second coil unit 22. The first coil unit 20 of the third phase winding 14 embraces or engages the second coil connectors 18 of the previously wound first and second phase winding 14.

Furthermore the second coil unit 22 of the first phase winding 14 is wound starting from the starting position A1. In this embodiment similarly this second coil unit 22 comprises three first coil sides 26 and three second coil sides 27. The second coil unit 22 of the first phase winding 14 is consequently laid over the coil connectors 18 between first and second coil units 20 and 22 of the second and third phase windings 14. As a result, the second coil unit 22 of the first phase winding 14 embraces these coil connectors 18. After winding the final coil side 24 of the second coil unit 22 of the first phase winding 14 a coil connector 18 is laid in the first direction until the starting position A4 is reached. The next first coil unit 20 of the first phase winding with another subsequently connected coil connector 18 is wound at starting position A4.

In the next winding step the second coil unit 22 of the second phase winding 14 comprising three first coil units 26 and three second coil units 27 is wound—starting from the starting position A2—. In this step the second coil unit 22 of the second phase winding 14 embraces the coil connector 18 of the third phase winding 14 between the first coil unit 20 and the second coil unit 22 of the third phase winding 14. It also embraces the coil connector 18 extending from the second coil unit 22 of the first phase winding 14.

Next, starting from the starting position A3, the second coil unit 22 of the third phase winding 14 is wound around the winding bar 10 with three first coil sides 26 and three second coil sides 27. After the last coil side 24 and/or 26 is wound on the bar a coil connector 18 is similarly laid extending from it in the first direction. The second coil unit 22 of the third phase winding 14 embraces in a similar way the coil connectors 18 from the respective coil units 22 of the first and second phase windings 14.

Starting with the above-described winding scheme this winding process is repeated until six first coil units 20 and six second coil units 22 are wound for each phase winding. Thus the lap winding 12 is designed for a stator having 36 grooves. Analogously the lap winding 12 for a stator having 48 grooves should in an analogous manner be provided with eight first coil units 20 and eight second coil units 22 for each phase winding 14.

Figure 6:
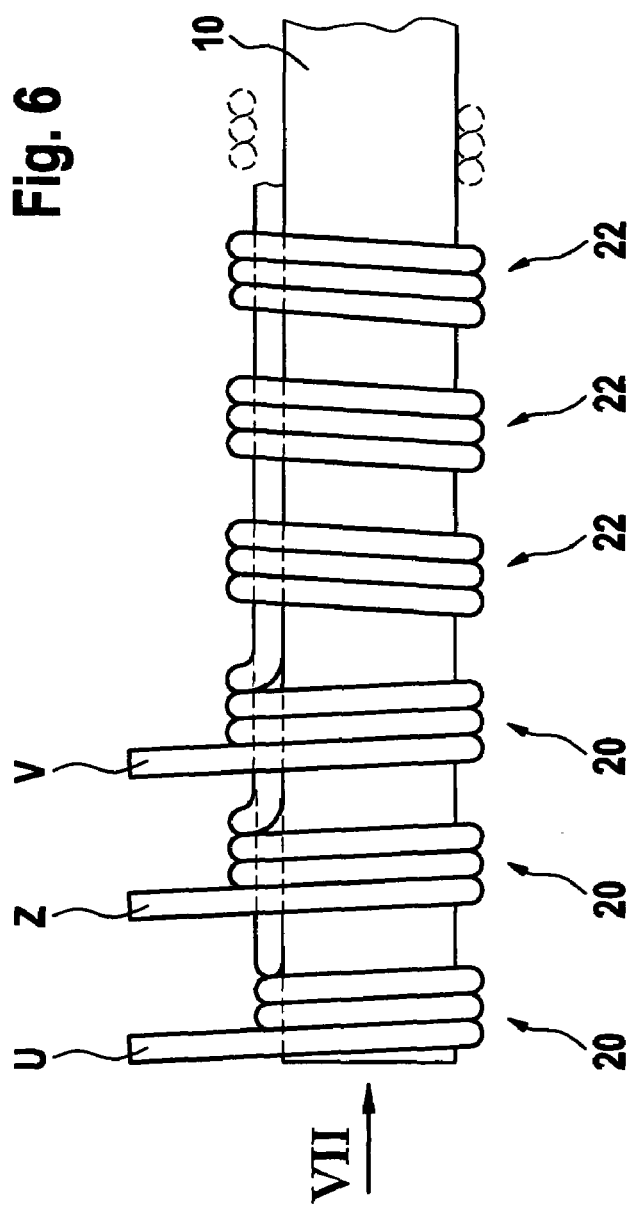
FIG. 6 is a second side view of the two-layer lap winding from FIG. 5.

The winding bar 10 with the lap winding 12 of FIG. 5 on it is shown in FIG. 6. The arrangement of the first coil units 20 and second coil units 22 of the individual phase windings 14 is clearly shown.

Figure 7:
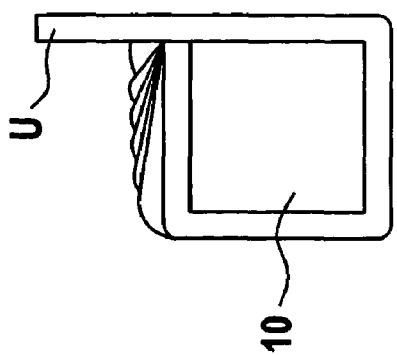
FIG. 7 is an end view of the lap winding according to FIG. 6.

An end-on view of the lap winding 12 wound on the winding bar 10 as seen in the direction VII in FIG. 6 is shown in FIG. 7. The lifting of the individual coil units 16 when they are guided over the coil connectors 18 can be clearly seen in FIG. 7.

Figure 8:
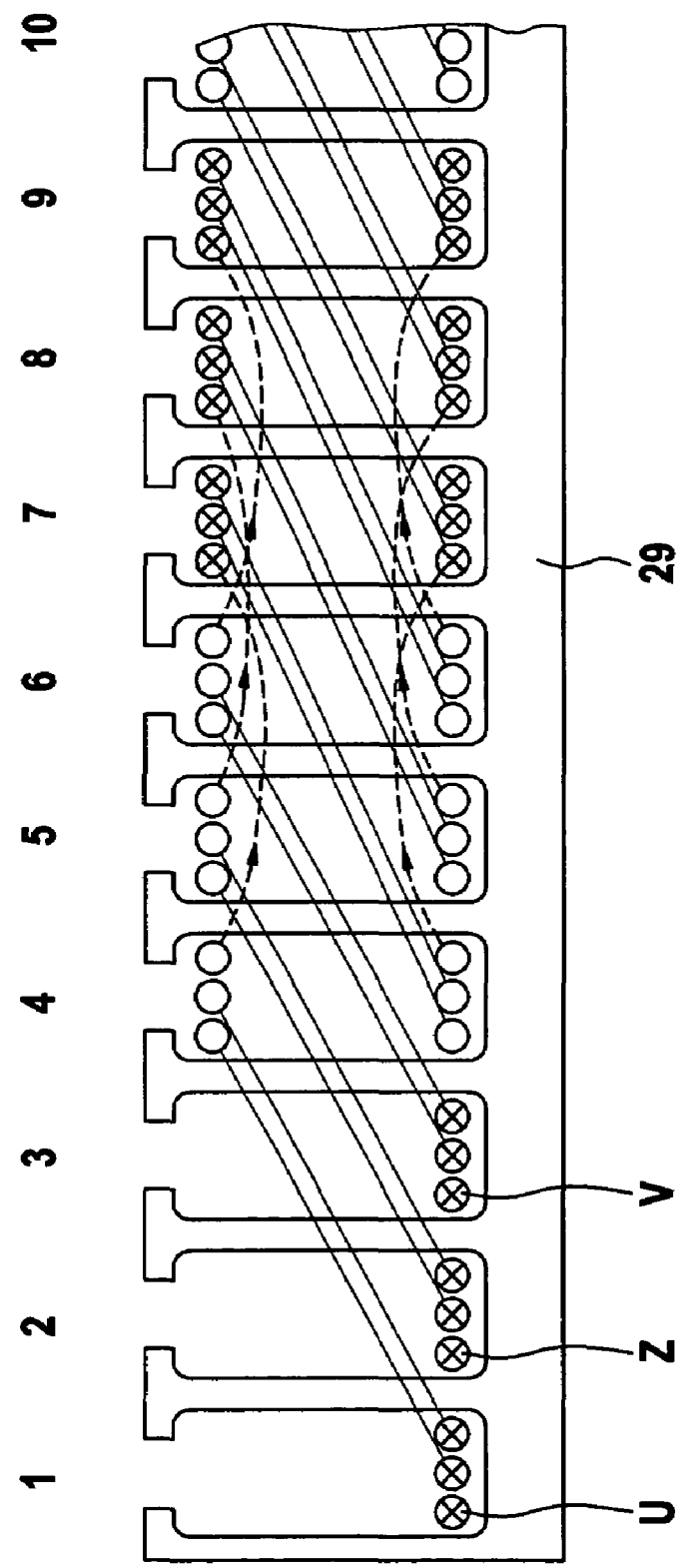
FIG. 8 is a schematic cross-sectional view of the third embodiment of the lap winding according to FIGS. 5 to 7 with a diagrammatic representation of the coil connections (wiring) and their positions in a strip-like stator member.

As previously shown schematically, an arrangement of a lap winding 12 in a strip-like stator packet 29 is illustrated in FIG. 8. The process described with the aid of FIGS. 5 to 7 produces a lap winding 12, in which the second coil sides 27 are tilted or swung around the first coil sides 26, as already described in relation to the previously described lap windings.

According to FIG. 8 the coil connectors 18 are covered by coil sections and thus are arranged within the coil or winding ends of the lap winding 12 and/or the phase windings 14.

Figure 9:
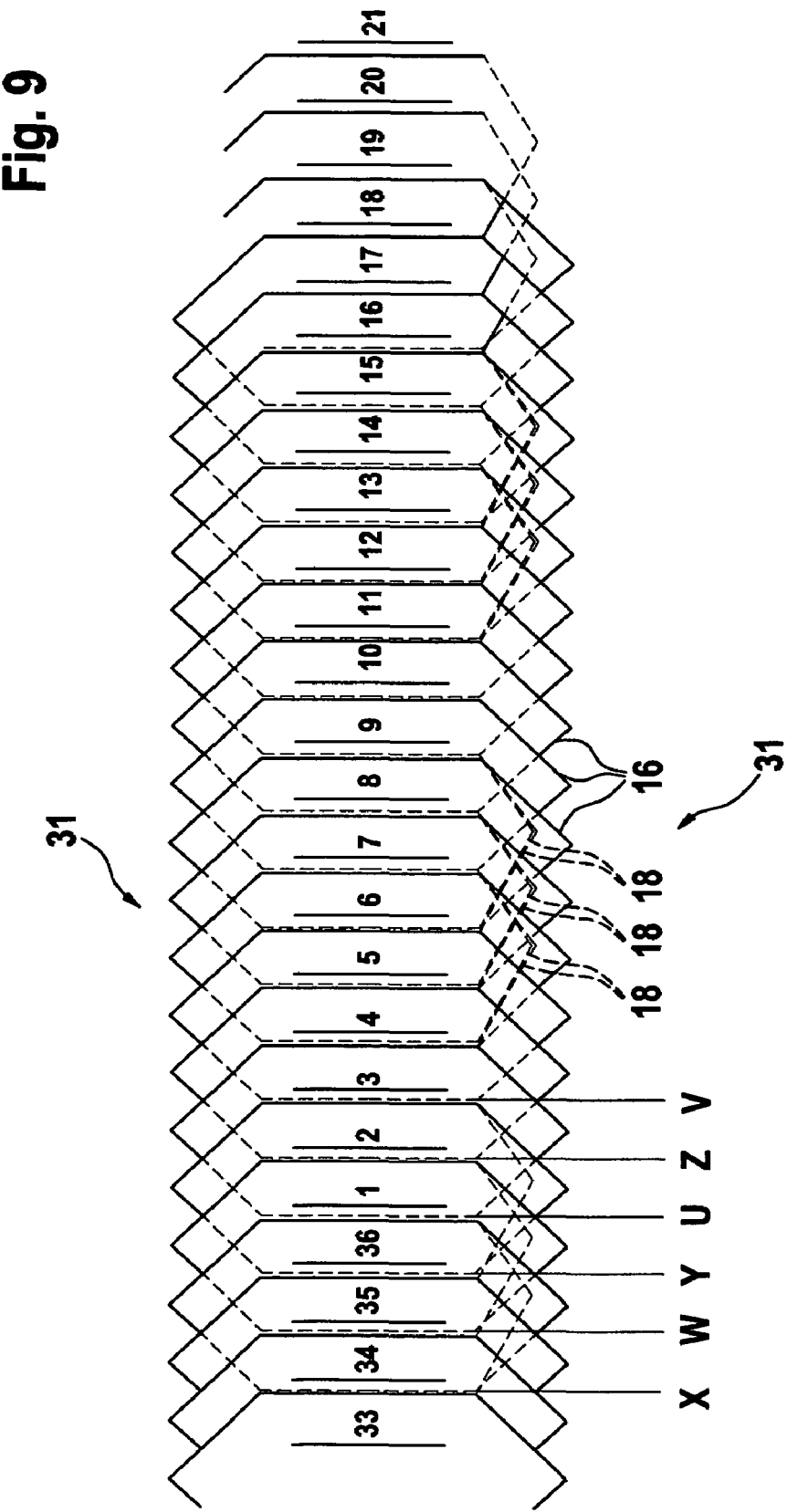
FIG. 9 is a plan view of the substantially flat two-layer lap winding according to FIGS. 5 to 8.

FIG. 9 shows an unwinding of the lap winding 12 of FIG. 8 in a plan view. This plan view corresponds approximately to a view from the radial interior to the radial exterior in a circular stator. FIG. 9 is somewhat simplified and shows the position of the first coil sides 26 in the so-called groove base with a broken line and the position of the second coil sides 27 with a solid line. The representation is simplified in as much as the actual number of turns or coils of the first coil unit 20 or the second coil unit 22 is not shown.

It is clearly shown in FIG. 9 that the coil connectors 18 are collectively within or inside regions of the coil units 16 forming the winding ends 31. When a lap winding 12 for a stator with 36 grooves is produced, a coil overhang formed from three coil units 16 and/or accompanying second coil sides 27 is formed, which, as shown in FIG. 9, is laid on the first coil sides 26 of the first coil unit 20 in the grooves 1, 2 and 3. The numbers 1 to 21 and 33 to 26 in the center of the lap winding 12 designate corresponding grooves of 36-groove stator member.

Figure 10:
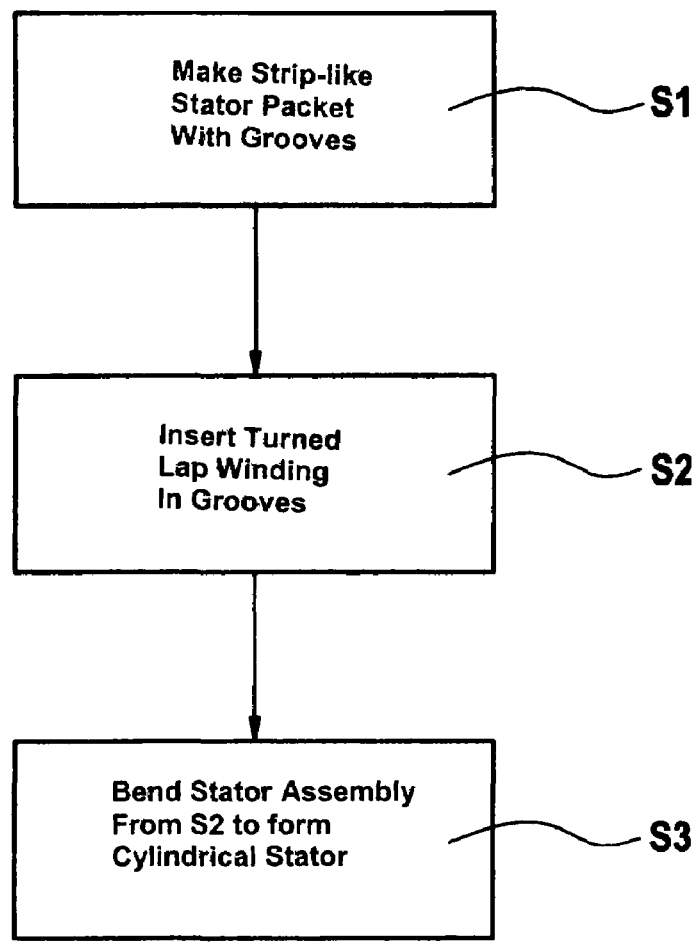
FIG. 10 is a block diagram of a manufacturing method for making a stator with the two-layer lap winding.

A manufacturing process for making a stator is illustrated in FIG. 10. In a first step S1 a strip-like stator member 29 provided with grooves and teeth is prepared. In a subsequent step S2 a two-layer lap winding 12 made according to the method of the present invention is laid in the grooves. In a third step S3 the assembly comprising the stator member 29 and the lap winding are bent around so that a hollow cylindrical stator is formed.

In summary a method for making a two-layer lap winding 12 for a multiphase electrical machine is described, in which the two-layer winding is made from a wire bundle, which is wound on a winding bar 10. In this method in a first step a first coil unit 20 of a first phase winding 14 is wound on the winding bar 10 and then a coil connector 18 of the first phase winding 14 is laid in a first direction. In further steps coil units 16, 22 of a further phase winding 14 are wound over coil connectors 18. According to a preferred embodiment of the invention at least one coil unit 16 embraces two coil connectors 18 of adjacent coil units 20 and/or 22. Respective coil connectors 18 connect two successive coil units 20 and 22. According to one embodiment the first phase winding is completely wound and then at least one further complete phase winding 14 is wound.

According to a preferred embodiment the coil unit 16 wound in one of the further steps is a first coil unit 20 of a further phase winding 14 and a coil connector is again laid in the first or winding direction. To make a three phase lap winding with an especially uniform winding end 31 at least one further first coil unit 20 of at least one further phase winding 14 is wound over two already laid coil connectors 18. This embodiment further provides that, after the winding of respective first coil units 20 of all phases, coil connectors 18 extend from all of these first coil units 20 to starting positions A1, A2, A3 for laying respective second coil units 22 of each phase winding 14. Usually the second coil units 22 of the phase windings 14 are wound in the same sequence as the first coil units 20 of the phase windings 14. The respective coil connectors 18 extend from the second coil units 22 to reach starting positions of corresponding further first coil units 20 of the phase windings.

Within the scope of the method of making of the lap winding 12 it is provided that each phase winding 14 has first coil units 20 and second coil units 22 arranged alternately following each other and connected with each other. Each coil unit 20 and/or 22 has at least one first coil side 26 and/or second coil side 27, which are found on opposite sides on the winding bar 10. After winding the phase windings 14 the winding 12 is removed from the winding bar 10. Then the first and second coil units 10 and 22 are swung so that at least one second coil side of a coil unit 16 is laid on the at least one first coil side 26 of the next coil unit 16 in the winding direction. The winding direction is also the circumferential direction of the stator member.

Figure 11:
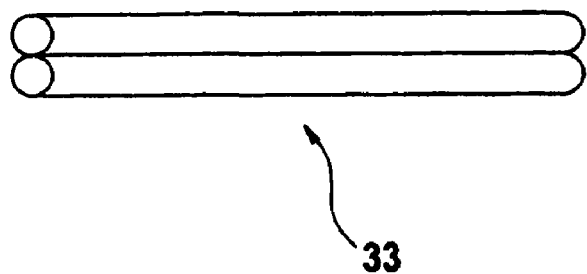
FIG. 11 is a view of an example of a wire coil.

Instead of an individual wire as sketched in FIGS. 1 to 10, which basically stands for a wire bundle, also a wire bundle 33 comprising at least two fastened together wires can be used, as shown in FIG. 11. The term "wire bundle" can also mean an individual wire in this description.

The disclosure in German Patent Application 103 29 576.3 of Jun. 30, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of making a two layer lap winding, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a two-layer lap winding (12) for a multiphase electrical machine from a wire bundle (33), said method comprising the steps of:
   a) winding a first coil unit (20) of a first phase winding (14) around a winding bar (10);
   b) subsequently laying a coil connector (18) of the first phase winding (14) in a first direction;
   c) winding at least one other first coil unit (20) of at least one other phase winding (14) around the winding bar (10) and over the coil connector (18);
   d) laying at least one other coil connector (18) extending from said at least one other first coil unit (20) of said at least one other phase winding (14) in said first direction, so that after the winding of said first coil unit and said at least one other first coil unit, said coil connector and said at least one other coil connector extend to respective starting positions (A1, A2, A3) of corresponding second coil units (22) of said first phase winding and said at least one other phase winding; and e) winding a second coil unit (22) of the first phase winding (14) around the winding bar (10) at a starting location (A1) for said second coil unit (22) after all coil connectors (18) of said first coil units (20) of all of said phase windings are laid.

2. The method as defined in claim 1, wherein said at least one other coil unit embraces or goes over two coil connectors (18), and each of said two coil connectors connects two coil units (16) of a respective different phase winding (14) that follow each other in succession on the winding bar.

3. The method as defined in claim 1, wherein corresponding second coil units (22) of said phase windings are wound on the winding bar (10) in a same sequence as said first coil unit (20) and said at least one other first coil unit (20), and wherein each of said second coil units (22) has a respective connected coil connector extending in the first direction therefrom to reach beginning positions of further coil units (20) of said respective phase windings.

4. The method as defined in claim 1, wherein said wire bundle comprises at least two individual wires.

5. A method of making a two-layer lap winding (12) for a multiphase electrical machine from a wire bundle (33), said method comprising the steps of:
a) winding a first coil unit (2) of a first phase winding (14) around a winding bar (10):
b) subsequently laying a coil connector (18) of the first phase winding (14) in a first direction;
c) winding at least one other coil unit (16) of at least one other phase winding (14) around the winding bar (10) and over the coil connector (18), said at least one other coil unit (16) being at least one other first coil unit (20) of said at least one other phase winding (14); and
d) laying at least one other coil connector (18) extending from said at least one other first coil unit (20) in said first direction;
wherein, after the winding of said first coil unit and said at least one other first coil unit, said coil connector and said at least one other coil connector extend to respective starting positions (A1, A2, A3) of corresponding second coil units (22) of said first phase winding and said at least one other phase winding; and
wherein said first coil units (20) and said second coil units (22) of each phase winding (14) are arranged alternately following each other, and each of said first and second coil units has at least one first coil side (26) and at least one second coil side (27) on an opposite side from said at least one first coil side (26), and further comprising removing the two-layer lap winding (12) from the winding bar (10) after the winding, and swinging or turning the first coil units (20) and the second coil units (22) of said each phase winding relative to each other so that said at least one second coil side (27) of one coil unit is laid on at least one first coil side (26) of a next coil unit of the same phase winding in a winding direction.

6. A method of making a stator for a multiphase electrical machine, said method comprising the steps of:
a) making a two-layer lap winding by a method comprising winding a first coil unit (20) of a first phase winding (14) around a winding bar (10), then laying a coil connector (18) of the first phase winding (14) in a first direction, after the laying of the coil connector (18) winding at least one other first coil unit (20) of at least one other phase winding (14) around the winding bar and over the coil connector (18), subsequently laying at least one other coil connector (18) extending from said at least one other first coil unit (20) of said at least one other phase winding (14) in said first direction, so that after the winding of said first coil unit and said at least one other first coil unit, said coil connector and said at least one other coil connector extend to respective starting positions (A1, A2, A3) of corresponding second coil units (22) of said first phase winding and said at least one other phase winding, and winding a second coil unit (22) of the first phase winding (14) around the winding bar (10) at a starting location (A1) for said second coil unit (22) after all coil connectors (18) of said first coil units (20) are laid;
b) providing a strip-like stator member (29) with grooves and teeth;
c) laying said two-layer lap winding in the grooves of the strip-like stator member (29) to form a stator component assembly; and
d) bending said stator component assembly around to form a hollow cylindrical stator.

7. A method of making a stator for a multiphase electrical machine, said method comprising the steps of:
a) making a two-layer lap winding by a method comprising winding a first coil unit (2) of a first phase winding (14) around a winding bar (10), then laying a coil connector (18) of the first phase winding (14) in a first direction, winding at least one other coil unit (16) of at least one other phase winding (14) over the coil connector (18), wherein said at least one other coil unit (16) is at least one other first coil unit (20) of said at least one other phase winding (14), then laying at least one other coil connector (18) extending from said at least one other first coil unit (20) in said first direction, wherein, after the winding of said first coil unit and said at least one other first coil unit, said coil connector and said at least one other coil connector extend to respective starting positions (A1, A2, A3) of corresponding second coil units (22) of said first phase winding and said at least one other phase winding, and wherein said first coil units (20) and said second coil units (22) of each phase winding (14) are arranged alternately following each other, and each of said first and second coil units has at least one first coil side (26) and at least one second coil side (27) on an opposite side from said at least one first coil side (26), and further comprising removing a two-layer lap winding (12) from the winding bar (10) after the winding and swinging or turning the first coil units (20) and the second coil units (22) of said each phase winding relative to each other so that said at least one second coil side (27) of one coil unit is laid on at least one first coil side (26) of a next coil unit of the same phase winding in a winding direction;
b) providing a strip-like stator member (29) with grooves and teeth;
c) laying said two-layer lap winding in the grooves of the strip-like stator member (29) to form a stator component assembly; and
d) bending said stator component assembly around to form a hollow cylindrical stator.

* * * * *